March 26, 1940.　　　　M. HENTER　　　　2,194,596
AIRPLANE
Filed April 24, 1936　　　7 Sheets-Sheet 1

WITNESSES:
H. N. Schmidt
J. Wozniak

INVENTOR: Mathias Henter

March 26, 1940.     M. HENTER     2,194,596
AIRPLANE
Filed April 24, 1936     7 Sheets-Sheet 2

WITNESSES:
H. N. Schmidt
J. Wozniak

INVENTOR: Mathias Henter

March 26, 1940.  M. HENTER  2,194,596

AIRPLANE

Filed April 24, 1936  7 Sheets-Sheet 3

WITNESSES:
H. N. Schmitt
J. Wozniak

INVENTOR:
Mathias Henter

March 26, 1940.                M. HENTER                  2,194,596
                                AIRPLANE
                          Filed April 24, 1936            7 Sheets-Sheet 4
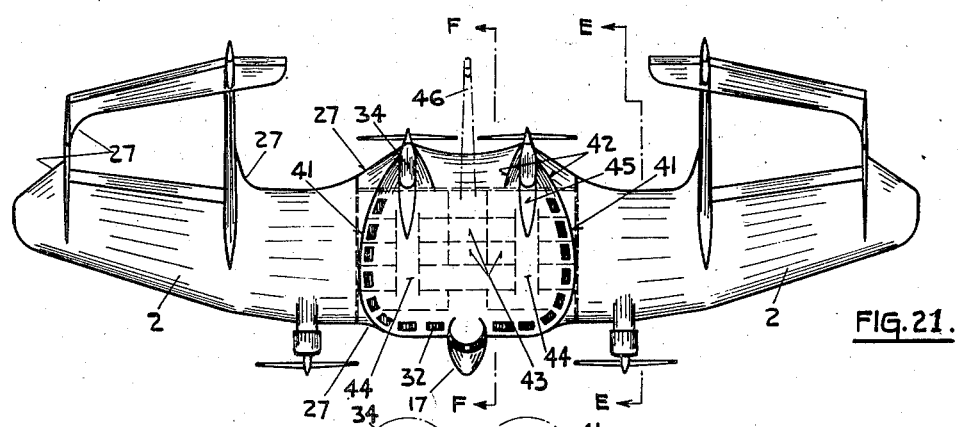
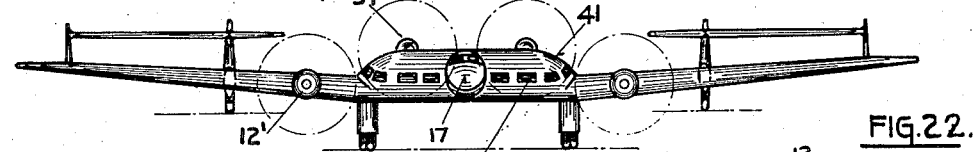
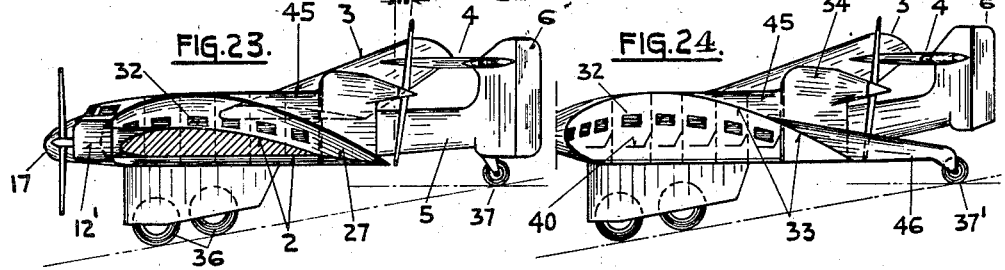
WITNESSES:                                    INVENTOR:
                                              Mathias Henter March 26, 1940.    M. HENTER    2,194,596
AIRPLANE
Filed April 24, 1936    7 Sheets-Sheet 5

WITNESSES:
H. N. Schmidt
J. Wozniak

INVENTOR:
Mathias Henter

March 26, 1940.  M. HENTER  2,194,596
AIRPLANE
Filed April 24, 1936  7 Sheets-Sheet 6

WITNESSES:
H. N. Schmidt
J. E. Wozniak

INVENTOR:
Mathias Henter

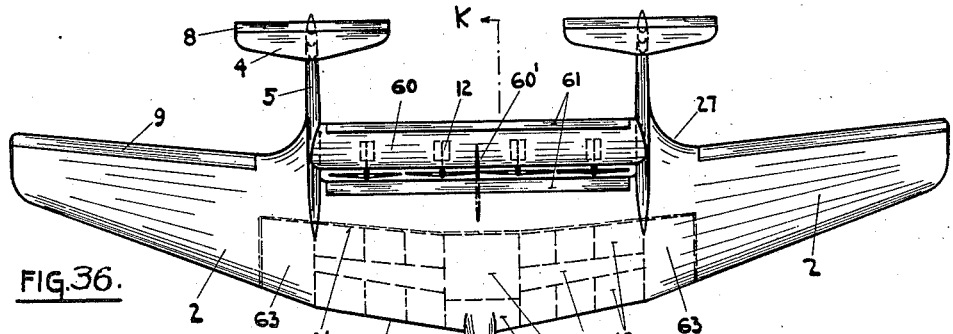
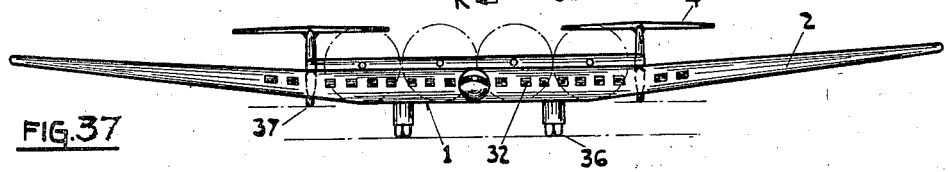
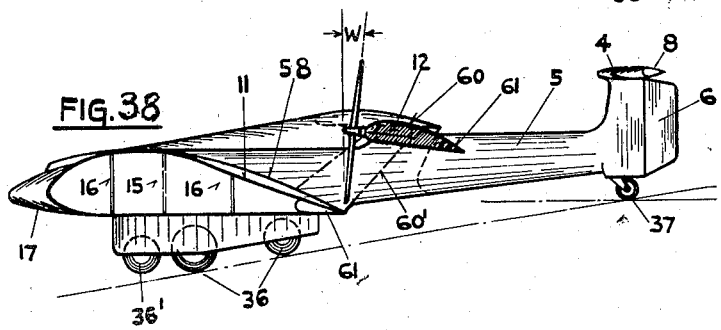

Patented Mar. 26, 1940

2,194,596

UNITED STATES PATENT OFFICE 2,194,596

AIRPLANE

Mathias Henter, West Allis, Wis.

Application April 24, 1936, Serial No. 76,155

21 Claims. (Cl. 244—13)

The improvements relate to novel steering and stabilizing means and these means are adapted in different forms to various types of airplanes, that is, to the superairliner of the flying-wing type as well as to the smallest aircraft, to land as well as to seaplanes.

The new steering and stabilizing means are associated with resulting novel arrangements and structures to eliminate the fuselage as it is known today; further with improvements in mounting the power plant; further with structures to improve the landing gear; further with arrangements to increase the lift of the supporting wing to thereby insure lower landing speed without slowing the air-or flying speed; further with arrangements for reducing the parasite or dead resistance as well as the total drag to lower the required power for propulsion; and further with arrangements for reducing the induced drag and also the profile and form drag.

The objects and the advantages of the various arrangements for the different types of airplanes, devices, and structures will be hereinafter pointed out in the specification and claims and are shown on the drawings.

To the drawings:

Fig. 21 is a plan view of a land plane with a passenger housing of an aerofoil-and streamlined shape.

Fig. 22 is a front view of Fig. 21.

Fig. 23 is a sectional view E—E indicated in Fig. 21.

Fig. 24 is a sectional view F—F indicated in Fig. 21.

Fig. 36 is a plan view of flying-wing type land plane with two separate steering means and each one mounted on a single support.

Fig. 37 is a front elevation of Fig. 36.

Fig. 38 is a sectional view K—K indicated in Fig. 36.

Referring to the drawings it is to be stated that similar parts of the structures and devices are given the same numbers and letters respectively.

The drawings illustrate different types of airplanes incorporating the novel steering and stabilizing devices in various forms and applications. For a better understanding of the merits of the invention it is necessary to illustrate the associated and resulting novel arrangements of power plants, landing gear, sustaining wing, passenger housing, and other associated structures.

The various combinations illustrated on the drawings show that the entire power plant and the passenger housing is mounted on the central wing portion whereas a separate steering stabilizing device is disposed behind each outer wing portion and spaced rearwardly to the outer wing portions, power plant and passenger housing. The entire power plan is mounted between the two separated stabilizing means. The so-called fuselage is eliminated. No structures, that is, no obstructions of any kind are mounted behind the central wing portion. When stalling a present time airplane the flow tends to break away first from the central wing portion because such obstructions as fuselage, steering devices, and landing gear are all mounted on the central wing portion. The downwash from the wing is hindered by the non-lift producing elements and the flow breaks away and the loss of the lift is the result. Furthermore, if the flow breaks away from the central wing portion, the stabilizing and steering means of the present time airplane do not function any longer on account of the vortex wake rearwards of the central wing portion. The novel combination of stabilizing means, power plant, and passenger housing eliminate this fault because there is no structure of any kind behind the central wing portion and inasmuch as the entire power plant is mounted on the central wing portion it supports effectively the unobstructed downwash from the wing, therefore the danger of the flow breaking away is greatly reduced, that is, the stalling is effectively prevented.

Figure 1:
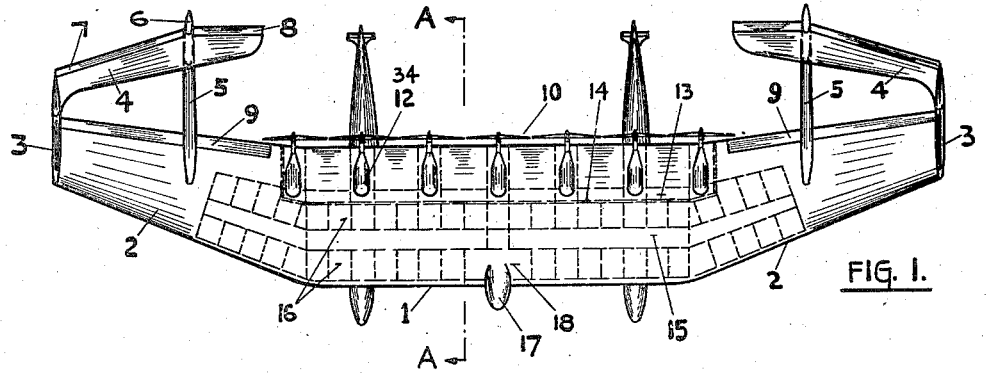
Fig. 1 is a plan view of a super flying-wing type seaplane.
Figure 2:
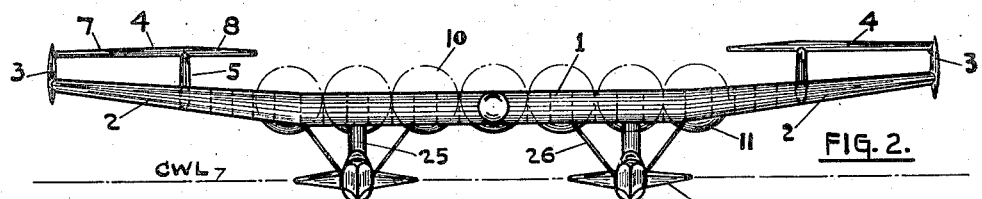
Fig. 2 is a front view of Fig. 1.
Figure 3:
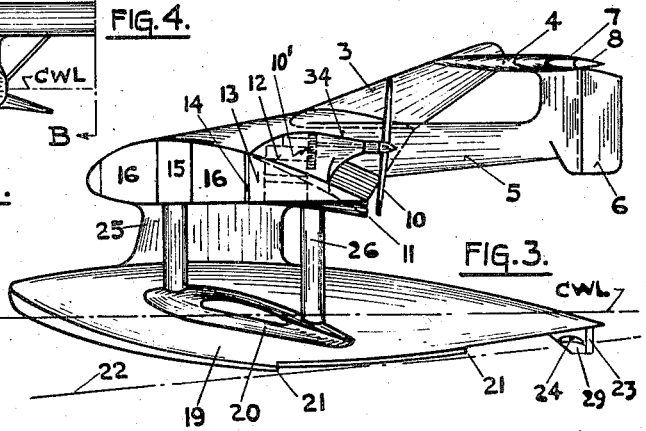
Fig. 3 is a sectional view A—A indicated in Fig. 1.

Figs. 1, 2, and 3 show a flying-wing type seaplane adapted to house passengers within the main sustaining wing. The sustaining wing is formed by the laterally extending central portion 1 and by the outwardly and rearwardly extending wing sections 2. At the outer tips of the wings 2 the upright end surfaces or fins 3 are attached. These fins extend vertically and transversely below and above the wings 2 and thus minimize the induced drag as well as serve as stabilizers. These stabilizing surfaces extend rearwards and have attached the stabilizing wings 4 with elevators 7 and 8. The outrigger 5 extends rearwardly from the wing 2. The stabilizing surfaces 3 and the outrigger 5 support the stabilizing wing 4 with its elevator 7 and 8 and also the rudder 6. The outrigger serves also as stabilizing surface. The elevator 7 may also, if elected, serve as aileron in conjunction with the aileron 9 attached to the wing 2. It is to be noted in Fig. 1 that the sustaining wing 2 and the stabilizing wing 4 have a V-shape when viewed in the plan view. By means of this form a rigid construction is insured, but at the same time a sufficient flexibility in the structure is obtained.

The stabilizing surfaces 3 reduce the induced drag not only for sustaining wings 1 and 2 as said above but also for the stabilizing wing 4 with its elevators 7 and 8.

This novel stabilizing and steering arrangement insures not only mechanical strength, light weight, and safety but also aerodynamical improvements in reducing the induced drag, the profile drag, and the parasite resistance of the airplane. This arrangement also prevents to a great extent the airplane from going into a spin, which feature relieves the human element very much in handling the airplane. The feature of mounting the steering and stabilizing devices behind the outer wing portions decentralizes the load of the airplane wing, which load is in present time airplanes well centralized in the middle of the sustaining wing. The result is lighter weight and increased safety.

The feature of providing two separate and also independent steering and stabilizing devices increases the safety of the airplane not only from the point of view of the traveling public but also of the airline operators.

In this particular airliner of Figs. 1, 2, and 3 seven propellers 10 of the pusher type are mounted closely side by side along and above the trailing edge of the sustaining wing section 1. Concave recesses 11 are formed in the upper side and in the trailing edge of the wing in order to gain the effects described in the U. S. Patent #1,868,832, July 26, 1932, Aircraft; but here in this invention the trailing edge of the recesses 11 and the trailing edge of the regular wing profile form a continuous straight line when viewed in the plan view of Fig. 1. This improvement reduces the profile,—the form,—and the frictional drag of the main wing section 1. The arrangement of these recesses is better illustrated in Fig. 17. The downwash from the central wing section is greatly improved as there are no elements of any kind mounted behind this central section. The arrangement of a plurality of propellers mounted on the central wing portion even without the recesses 11 but with no structures of any kind behind the central wing section insures a wider working range of the wing, the climbing of the airplane is very much improved, and a lower landing speed is obtainable without lowering the flying speed. The power plant arrangement of Fig. 1 is very desirable for a seaplane because it is impossible that spray water reaches the propellers when rising from or setting down on the water.

The engines 12 are partly protruding from the upper side of the wing 1 and are properly cowled in a streamline nacelle 34. The engines are all accessible during flight through the service passage 13. Reducing gears 10', if elected, allow high speed engines. Further the propeller and engine noise cannot reach the passenger cabins in such a volume as would be the case if the propellers are mounted in front of the wing because the sound waves have to travel against the air flow. A sound proof wall 14 is provided to further protect the passenger cabins from engine noise. The passage 15 extends through the central wing section 1 in the direction of the span and into the lateral wing sections 2 in the general direction of the leading edges of the lateral wing sections 2, and the cabins 16 are arranged along the passage at opposite sides thereof. The nacelle 17 and the space 18 serve as the navigation quarters.

The floats or boats 19 serve as landing gear. The letters CWL on the drawings indicate the water level when the airliner is at rest. The floats 19 are Zeppelin-shaped to increase the mechanical strength and to reduce the weight. Gliding wings 20 and steps 21 facilitate the take-off. The water level 22 is the theoretical take-off level. Rudder 23 and, if desired, elevator 24 are attached to the float to steer in water. Such a Zeppelin-shaped float has the least possible air resistance. The inner space of the float is to be used for carrying the fuel and also other freight of the airliner. The central support 25 serves also as a passage from the main wing into the float. Braces 26, if elected, may take the entire vertically directed forces, whereas the central support 25 has to transmit to the wing 1 only longitudinally directed forces.

Figure 5:
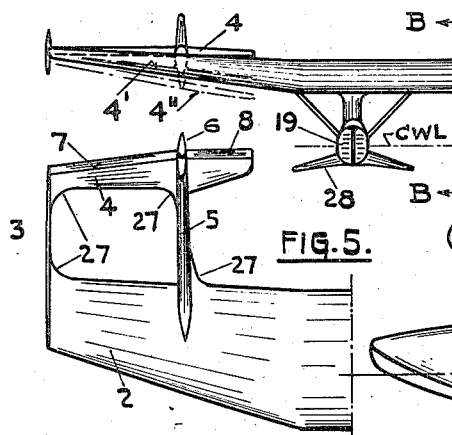
Fig. 5 is a partial plan view of Fig. 4.
Figure 4:
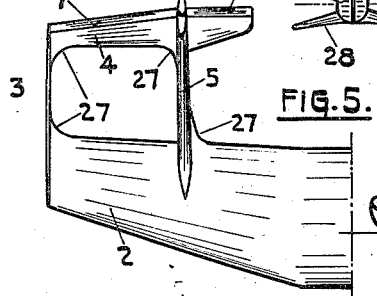
Fig. 4 is a partial front view similar to Fig. 2.
Figure 6:
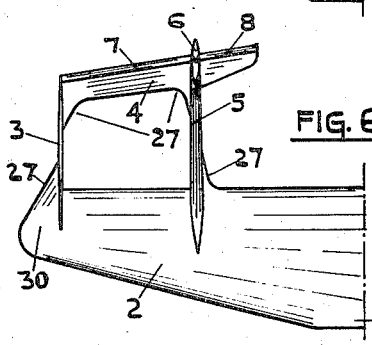
Fig. 6 is a partial plan view similar to Fig. 5.
Figure 7:
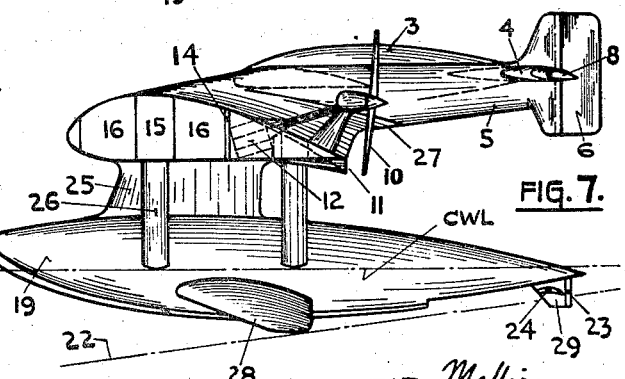
Fig. 7 is a sectional view indicated at B—B in Fig. 4.

In the seaplane of Figs. 4, 5, and 7 the stabilizing wing 4 is arranged behind the wings 2 either in horizontal alignment with the trailing edge of the wings 2 as indicated in full lines, or somewhat above or below that trailing edge as indicated by the chain dotted lines 4' and 4" respectively. Figs. 5 and 6 show the outrigger 5 braced to the wing 2 and, if elected, also braced to the stabilizing wing 4 by extending the respective wing profile as indicated at 27. Fin 3 may also be braced in the same manner. This bracing does not produce a dead resistance as would be the case if open braces as known were used, but here the braces are a part of the respective wing and this bracing produces a very rigid construction and support for the steering devices. The outrigger 5 serves also as a stabilizing surface.

The Zeppelin-shaped float 19 of Figs. 4 and 7 is equipped with submerged hydrowings 28. The wings are arranged in an inverted V-form when viewed from the front as shown in Fig. 4 and also in a V-form when viewed in a plan view as clearly seen in the side elevation of Fig. 7. The steerings means 23 and 24 for water and the steering means 6, 7, and 8 for air are preferably interlocked. The water level line 22 in Figs. 3 and 7 shows that the stabilizer fin 29 with its rudder 23 comes first in contact with the water when setting down and emerges last out of the water when starting. This feature insures a very smooth starting and landing.

The combination of the arrangements for the steering and stabilizing devices, for the power plants, and for the float arrangements as shown for the seaplanes of Figs. 1 to 13 inclusive show clearly that the downwash from the central wing portion is in no way hindered and therefore the improvements described previously are insured.

Fig. 6 shows an arrangement for the steering and stabilizing means and is similar to Fig. 5. But here the elevators 7 and 8 are arranged in alignment with each other. The tip 30 of the wing 2 is extended beyond the stabilizing surface 3 and in conjunction with the stabilizing surface 3 helps to reduce the induced resistance of the airliner. The stabilizing fin 3 and outrigger 5 are braced to the main wing 2 and to the tip 30 as well as to the stabilizing wing 4 as shown and described above in connection with Fig. 5.

Figure 8:
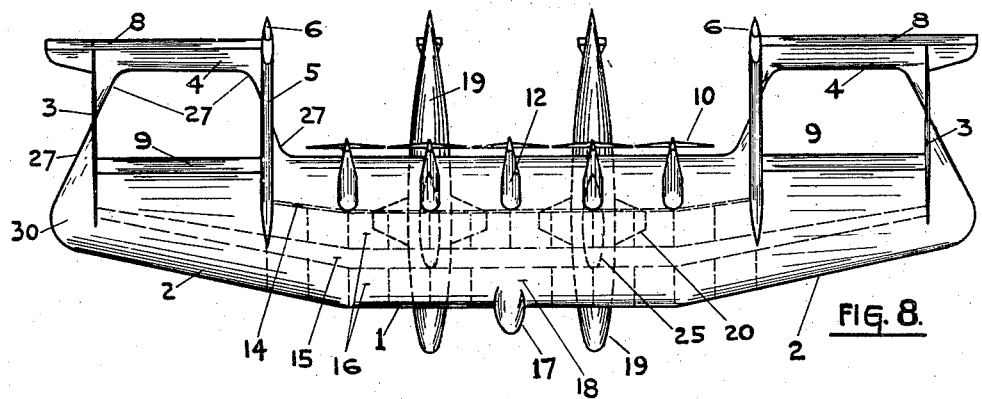
Fig. 8 is a plan view of a seaplane similar to Fig. 1.
Figure 9:
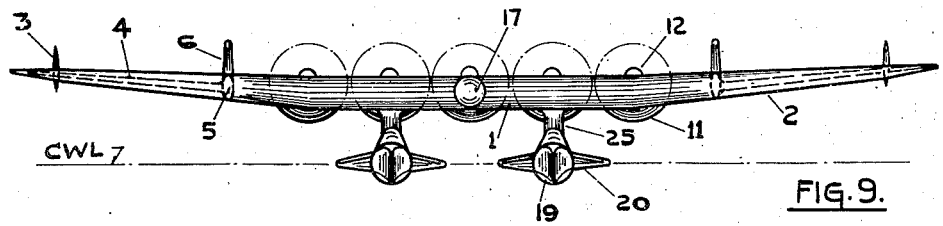
Fig. 9 is a front view of Fig. 8.

Figs. 8 and 9 show a flying-wing type seaplane similar to Figs. 1 and 2. The stabilizing means are similar to Fig. 6 but here the trailing edge of wing 2 and stabilizing wing 4 are parallel. The stabilizing wing has only one elevator attached to it. An aileron 9 is disposed between the outrigger 5 and the fin 3. Each float 19 is attached to the wing 1 by a central streamlined support 25.

Figure 10:
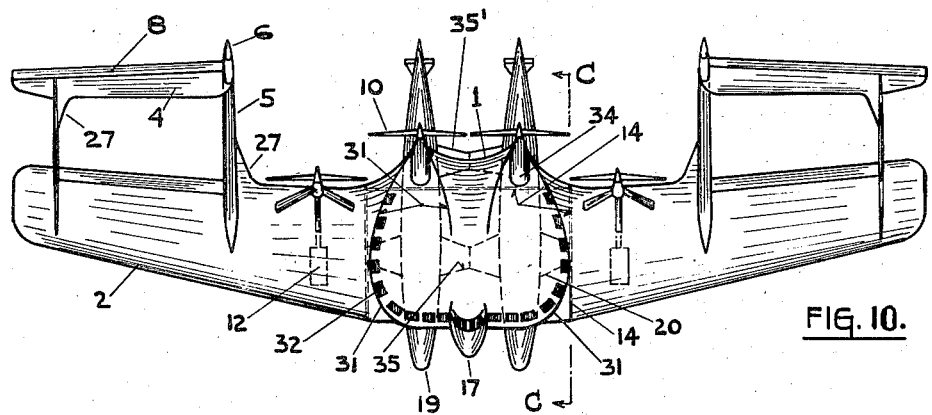
Fig. 10 is a plan view of a seaplane with passengers housed in two aerofoil-shaped and streamlined nacelles.
Figure 11:
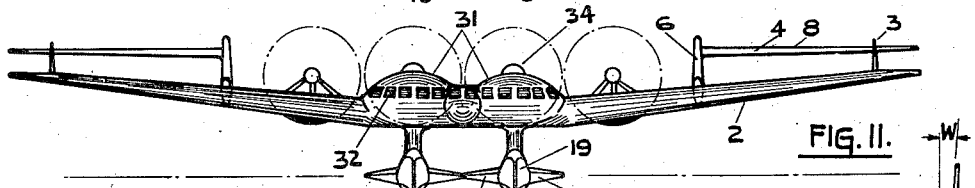
Fig. 11 is a front view of Fig. 10.
Figures 12, 13:
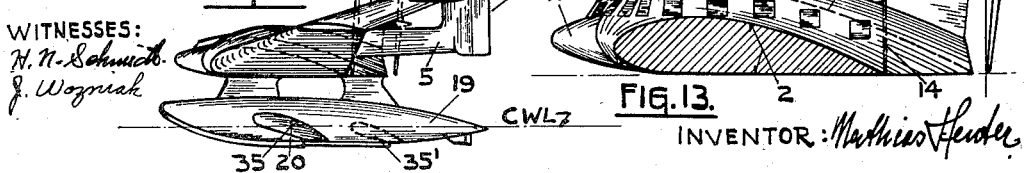
Fig. 12 is a side elevation of Fig. 11.
Fig. 13 is a sectional view C—C indicated in Fig. 10.

Figs. 10, 11, 12, and 13 show different views of a seaplane with passengers housed in two streamlined nacelles. The steering and stabilizing arrangement is similar to the one shown in Figs. 8 and 9, but here the trailing edges of wings 2 and 4 are not parallel. The steering and stabilizing means are mounted behind and above the outer wing portions 2. The passenger housings 31 are streamlined when viewed in the plan view of Fig. 10 and aerofoil-shaped when viewed in the side elevation as seen in Fig. 13. Windows 32 are arranged in the front and both outer walls of the housing. Dotted line 33 in Fig. 13 shows the profile of the wing 1 between the housings. Two engines 12 are mounted within the wing and two engines within the cowlings 34 at the stern of the housings 31. Hydrowings 20 and 35 are attached to the floats. The wings 35 bind the two floats together. Two such wings 35 and 35' may be arranged in tandem as shown in Figs. 10 and 12. This feature renders a rigid construction for the float arrangement. This bracing with wings produces no dead resistance. The outer wings may be, if desired, omitted.

In the arrangement of this seaplane it is shown that the novel steering and stabilizing means in conjunction with the arrangement of power plant, passenger cabins, floats, and wings give an unobstructed path for the downwash from the central wing portion with its power plant, passenger housing, and float. Thus the stalling of this aircraft is remote. A seaplane of the herein described types incorporating the novel steering and stabilizing devices and the other associated structures has substantially less dead air resistance than a seaplane of the flying-boat type such as the "American Clipper." Moreover, a seaplane of the herein described type will be able to ride out a heavier sea than the flying boat. The cruising radius will be increased because the required power for propulsion is very much reduced on account of the reduced resistance and of the reduced weight.

Figure 14:
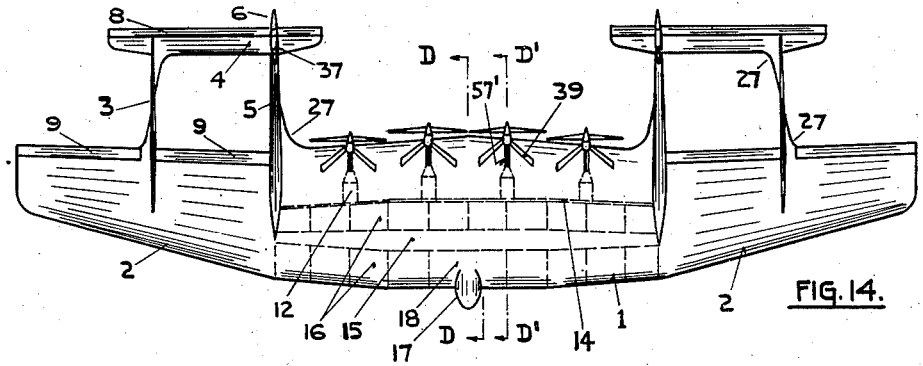
Fig. 14 is a plan view of a flying-wing type land airplane.
Figure 15:
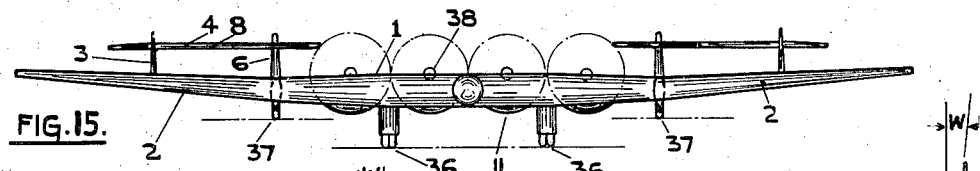
Fig. 15 is a front view of Fig. 14.
Figures 16, 17:
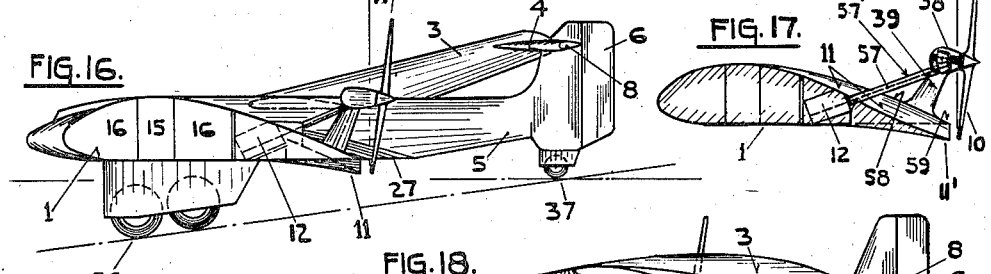
Fig. 16 is a sectional view D—D indicated in Fig. 14.
Fig. 17 is a sectional view D'—D' indicated in Fig. 14.

In the following various types of land airplanes incorporating the novel steering and stabilizing devices are described. Figs. 14, 15, and 16 show an airliner of the flying-wing type. The wing and the steering and stabilizing arrangement is similar to Figs. 8 and 9. The stabilizing wing 4 with elevator 8 and the rudder 6 are supported by the outrigger 5 and by the stabilizing surface 3. The stabilizing wing 4 extends beyond the outrigger towards the center and also beyond the stabilizing fin towards the outside ends of the main wind. An aileron 9 is mounted on the sustaining wing between the supports of each stabilizing wing and also at the trailing edge of the outermost portions of the sustaining wing. This arrangement places the stabilizing wings nearer to the center of the craft but still laterally away from the power plant as clearly shown on the drawings. The fin or support 3 does not extend below the lower side of the wing 2, otherwise it would be too near to the ground.

The novel steering and stabilizing means are associated with the landing gear arrangement for land airplanes described in the following. A rearward wheel 37 is attached to each outrigger 5. Two sets of forward wheels 36 are attached to the sustaining wing. The rearward supporting points 37 are spaced laterally farther apart than the forward supporting points 36. This feature gives a better stability than the present time landing gear. The wheels may be, if desired, properly shielded as shown.

Fig. 17 shows the power plant arrangement and the recess or depression formed in the upper side and on the trailing edge of the wing in front of each airscrew. The engine 12 is housed within the wing 1, driving shaft 57 connects to the bevel gears in the cowling 38 and drives the propeller 10. This gear case 38 is supported by two supports 39 and a third support 57'. The driving shaft 57 is disposed within the support 57'. The recess 11 formed in the upper side of the wing terminates in the circular depressed trailing edge 11' as clearly shown in Figs. 17 and 15. The trailing edge 11' of the depression 11 and the trailing edge 59 of the regular profile 58 of the wing 1 are in alignment with each other as shown in Figs. 14 and 17. In this improved arrangement of the recesses and the regular wing profile all non-lift producing surfaces are eliminated. An unobstructed and smooth channel for the air flow to the propellers is given. The phenomenon of the flow breaking away is further prevented whereby the profile drag especially the form drag and the frictional drag is reduced and the lift is greatly improved.

Figure 18:
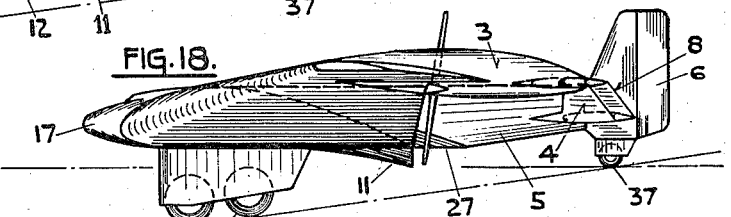
Fig. 18 is a side elevation of Fig. 19.
Figure 19:
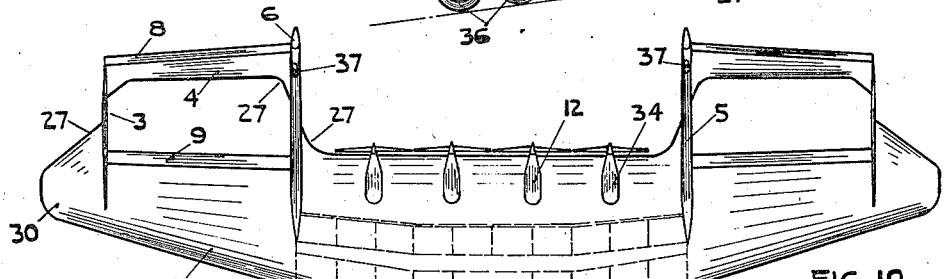
Fig. 19 is a plan view similar to Fig. 14.
Figure 20:
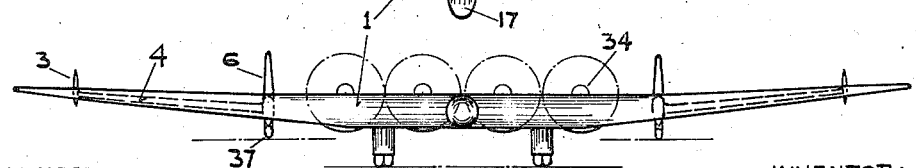
Fig. 20 is a front elevation of Fig. 19.
Figure 25:
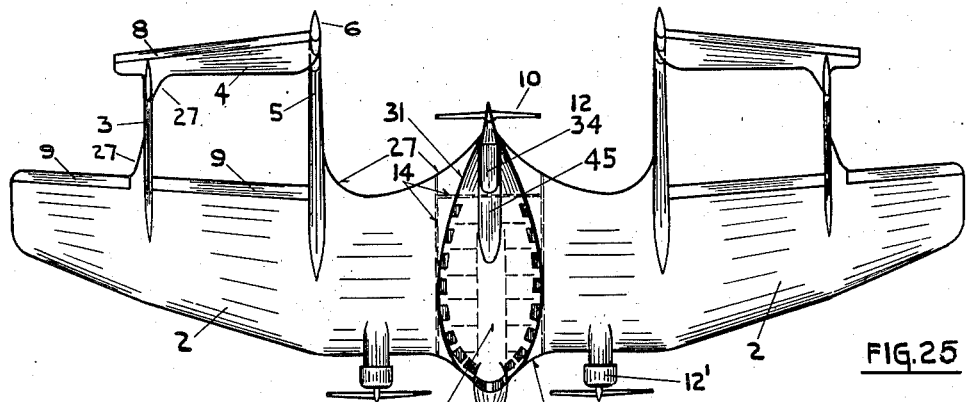
Fig. 25 is a plan view of an airplane with one passenger nacelle of an aerofoil-formed and streamlined nacelle shape.
Figure 26:
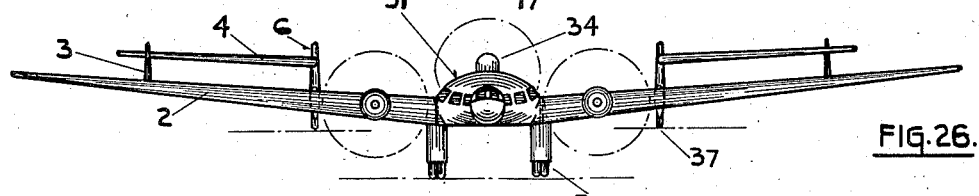
Fig. 26 is a front elevation of Fig. 25.
Figure 27:
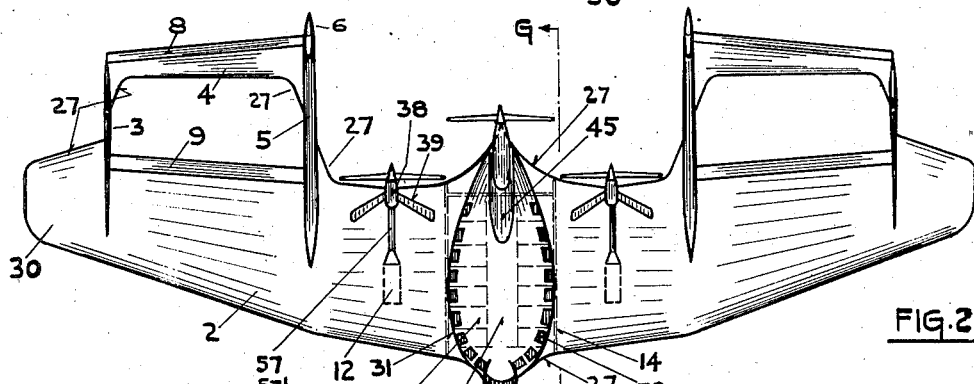
Fig. 27 is a plan view similar to Fig. 25.

Figs. 18, 19, and 20 show a flying-wing type airliner with landing gear arrangement of Figs. 14, 15, and 16 but with wing, stabilizing devices and power plant similar to Figs. 8 and 9. The aileron 9 and the wing 4 extend only between the supports 3 and 5. The low stabilizing wing 4 supported by the outrigger 5 and stabilizing surface 3 and braced by the wing extension 27 insures a very rigid and also light construction and support for the rearward landing gear 37, rudder 6 and elevator 8. The induced drag for the main wing as well as for the stabilizing wing and also the parasite air resistance is comparatively little in this airliner.

Figs. 21, 22, 23, and 24 show an airliner similar to the one of Figs. 10, 11, 12, and 13. The stabilizing wings and the outer ends of the sustaining wing are V-shaped when viewed in the plan view of Fig. 21. The stabilizing wings extend inwards from the supports 5 and outwards to the stabilizing fins. Two forward air cooled engines 12' and two rear engines 12 mounted within the cowlings 34 are shown. The passengers are housed within a novel housing of the profile of a sustaining wing but with two streamlined sides 41 and two streamlined sterns 42. The profile 33 of the housing is shown in Fig. 24. The passengers are seated near the windows 32. Seats are indicated at 40. In the center of the housing such compartments as dining room indicated at 43 are located. The supporting wing 2 is extended to the leading as well as to the trailing edge of the housing. To secure for the passengers in the passageway 44 the necessary height up to the rear seats two arched or circular cowlings 45 are extended rearwardly from the thickest section of the housing profile 33.

Figure 31:
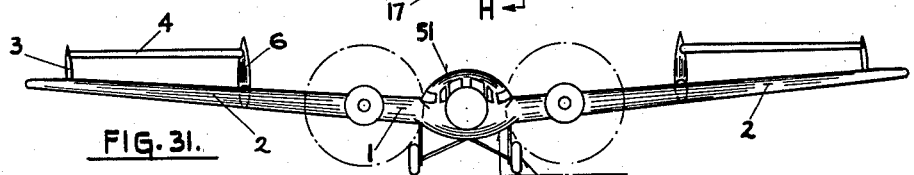
Fig. 31 is a front elevation of Fig. 30.
Figure 32:
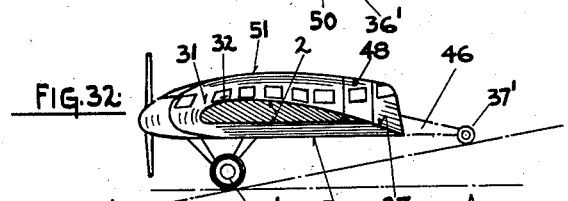
Fig. 32 is a sectional view H—H indicated in Fig. 30.
Figure 33:
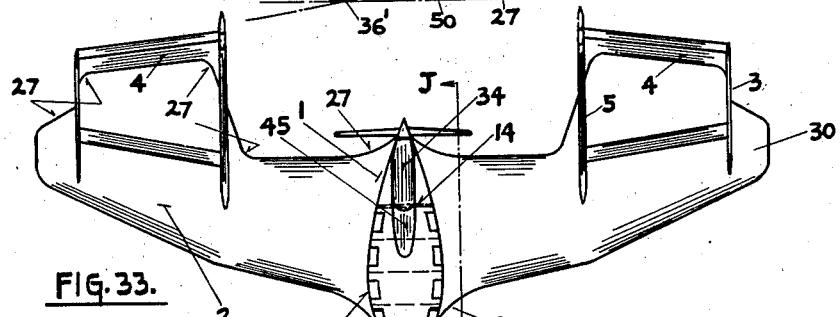
Fig. 33 is a plan view of a small aircraft with one power plant.
Figure 34:
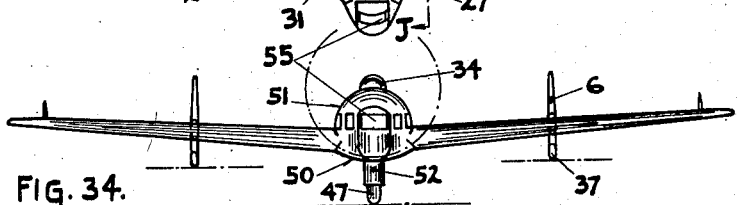
Fig. 34 is a front elevation of Fig. 33.
Figure 35:
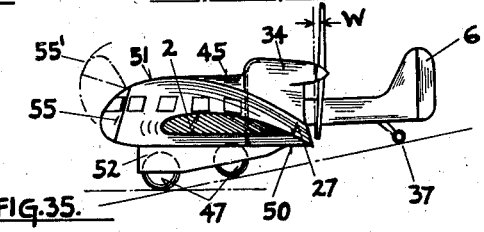
Fig. 35 is a sectional view J—J indicated in Fig. 33.

The following Figs. 25 to 32 inclusive and Figs. 33 to 35 incl. show the novel steering and stabilizing means adapted in medium sized and the smallest aircraft. The stabilizing and steering means are substantially the same as previously described herein for large aircraft. Various alterations are shown for the different airplanes. All arrangements show an unhindered downwash from the central wing section with its power plant and passenger cabins. The passenger cabin 31 is aerofoil-shaped and streamlined and its leading and trailing edges are joined to the supporting wing shown at 27 to give a smooth downwash of the air from the central section of the airplane.

The passenger cabins 31 in Figs. 25 to 29 inclusive show also the arched cowling 45 for forming a sufficiently high passageway 44 as described for Fig. 24.

Figure 28:
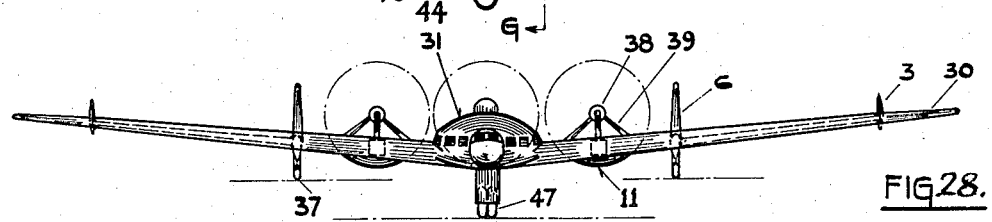
Fig. 28 is a front elevation of Fig. 27.
Figure 29:
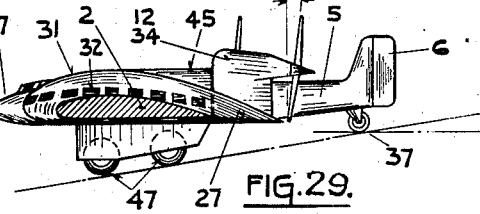
Fig. 29 is a sectional view G—G indicated in Fig. 27.

In Figs. 28 and 29 and also in Figs. 34 and 35 a novel arrangement for the landing gear of these small aircraft is illustrated in conjunction with the steering and stabilizing devices. One forward supporting point and two rearward supporting points are utilized. The forward main supporting gear 47 is mounted underneath the cabin 31 whereas one rearward gear 37 is attached to each outrigger 5 which is braced to the main wing 2 and the stabilizing wing 4. By this novel method of using only one forward main supporting gear and two small rearward gears the air resistance is reduced as well as the weight of the structure is lowered compared to the present time method of two main forward and one small rearward gear. This same landing gear method may be applied to small or medium sized seaplanes. Instead of the wheels floats can be utilized.

In Figs. 31 and 32 it is shown that the housing 31 protrudes from the regular profile of wing 2 on the lower side by the curved outer wall 50 and on the upper side by the arched structure 51. The arched as well as streamlined and aerofoil-shaped form of the housing 31 joins the normal profile of the wing 2 by means of the curved and aerofoil shaped wing extensions 27 in order that no part produces directly a dead air resistance in flight. A door is arranged in the rear of the housing at 48. A so-called "observation parlor" 49, if elected, may be arranged.

Figures 33, 34, and 35 illustrate a small airplane with one power plant adapted to the novel steering and stabilizing device. A door 55 is placed in the front of the cabin 31 and it is pivoted to be lifted up as shown at 55'. The forward landing gear is cowled as shown at 52. One wheel and without cowling, if desired, may be used. An air cooled engine in front of the cabin, if elected, may also be used. Viewing this small aircraft in the front elevation as shown in Fig. 34 it is evident that the air resistance is reduced to an extent not possible with known airplanes.

Figure 30:
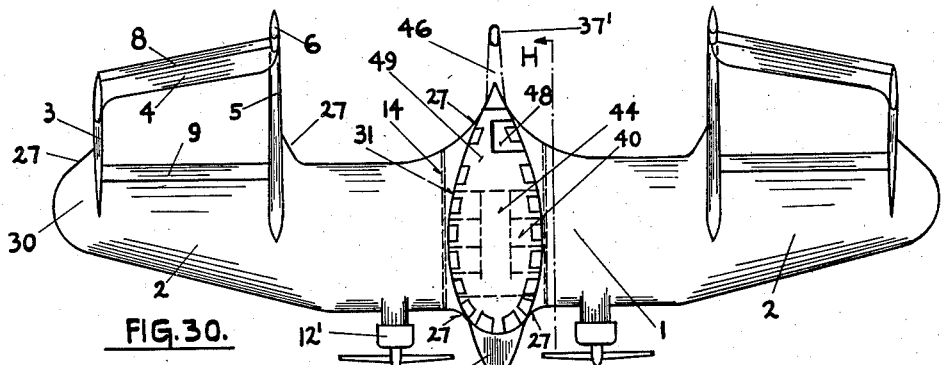
Fig. 30 is a plan view of an airplane showing the landing gear arrangement.

In Figs. 21 and 24 and also in Figs. 30, 32, and 31 a conventional three-point landing gear is illustrated. The two main forward supporting points 36 and 36' respectively are of the conventional design and the one rearward supporting point 37' may be a wheel attached to the outrigger 46.

A further application of the novel steering and stabilizing means is shown in Figs. 36, 37, and 38. This is a flying wing type land airplane. The power plant is mounted above the central wing section 1. A separate steering and stabilizing device, that is, a stabilizing wing, elevator, and rudder, is attached and carried by each outrigger 5. Each outrigger carries also a landing gear 37. The two outriggers extend rearwards from the sustaining wing and are laterally offset from the power plant. Between the outriggers 5 the wing 60 for supporting the power plant is placed. The engines 12 are, if elected, completely or partly housed within the wing 60. This wing 60 may be further supported by one or more supports 60' indicated in dotted lines. Flaps or auxiliary ailerons or aerofoils are placed on the trailing edge of wing 1 and wing 60 as indicated at 61. Social room 62 is placed in the middle of the main wing. Washrooms 63 are arranged on each end of the passageway 15. A four-point landing gear is used. Each forward gear may have two main supporting wheels 36 and one smaller guide wheel 36' to prevent the overturning of the airliner when landing at a very steep angle.

Although the invention has been described in considerable detail, such description is intended as illustrative rather than limiting, for example the features shown in one airplane may be interchanged with features shown in other arrangements.

Having thus described my invention, what I claim as new and desire to secure by Letters Patent is:

1. In an airplane, a sustaining wing comprising a central portion and laterally extending outer portions, propelling means mounted on said central portion, and stabilizing as well as steering means, mounted in rearwardly spaced relation to the said outer wing portions and laterally offset from said center wing portion including said propelling means, connected to the said sustaining wing by supporting members extending rearwardly therefrom.

2. In an airplane, a sustaining wing comprising a central portion and laterally extending outer portions, propelling means mounted on said central wing portion, and stabilizing as well as steering means, rearwardly and upwardly spaced to the said outer wing portions and laterally offset from said central wing portion including said propelling means, connected to the said sustaining wing by supporting members extending rearwardly and upwardly therefrom.

3. In an airplane, a sustaining wing comprising a central portion and laterally outer portions, propelling means and passenger housing provided on the said central wing portion, and stabilizing as well as steering means, mounted in rearwardly spaced relation to the said outer wing portions and laterally offset from said central wing portion, including said propelling means and passenger housing, connected to the said sustaining wing by supporting members extending rearwardly therefrom.

4. In an airplane, a sustaining wing, propelling means provided on the central portion of said sustaining wing, two substantially identical stabilizing as well as steering means, mounted in rearwardly spaced relation to the outer portions of said sustaining wing and laterally offset from said central wing portion including said propelling means, connected to the said wing in fixed position relative thereto, and supporting members extending rearwardly from said sustaining wing to carry said stabilizing and steering means.

5. In an airplane, a sustaining wing comprising a central portion and laterally extending outer portions, propelling means mounted on said central wing portion, and stabilizing as well as steering means, rearwardly spaced to said outer wing portions and laterally offset from said central portion including said propelling means, connected to said wing in fixed position relative thereto, a four-point landing gear providing two forwardly spaced supporting points underneath the said central wing portion and two rearwardly spaced supporting points underneath the said stabilizing and steering means, and supporting members extending rearwardly from said sustaining wing to support said stabilizing and steering means as well as the structures for the said rearwardly spaced supporting points of said landing gear.

6. In an airplane, a sustaining wing comprising a central portion and laterally extending outer portions, propelling means and passenger housing provided on said central wing portion, and stabilizing as well as steering means, mounted in rearwardly spaced relation to the said outer wing portions and laterally offset from said central wing portion including said propelling means and passenger housing, connected to the said wing in fixed position relative thereto, a three-point landing gear providing one forwardly spaced supporting point underneath said passenger housing and two rearwardly spaced supporting points underneath the said stabilizing and steering means, and supporting members extending rearwardly from said sustaining wing to support said stabilizing and steering means as well as the structures for the two rearwardly spaced supporting points of said landing gear.

7. In an airplane, a sustaining wing comprising a central portion and laterally extending outer portions, propelling means mounted on said central portion, an aerofoil-formed and streamlined passenger housing being an integral part of said central portion, two substantially identical stabilizing as well as steering means connected to the said outer wing portions, and said stabilizing and steering means being mounted rearwardly of said outer wing portions and laterally offset from said central portion to produce in combination with said central portion with its propelling means and passenger housing rearwardly of said central portion an unobstructed channel for the air flow.

8. In an airplane, a sustaining wing comprising a central portion and laterally extending outer portions, propelling means mounted on said central portion, an aerofoil-formed passenger housing being an integral part of said central portion, two substantially identical stabilizing as well as steering means connected to the said outer wing portions, and said stabilizing and steering means being mounted rearwardly of said outer wing portions and laterally offset from said central portion to produce in combination with said central portion, including the said propelling means and passenger housing, rearwardly thereof a channel for the air flow devoid of all obstructions.

9. In an airplane, a sustaining wing comprising a central portion and laterally extending outer portions, propelling means mounted on said central portion, an aerofoil-formed passenger housing being an integral part of said central portion, floating means of substantially Zeppelin-like form and equipped with hydrowings being attached to the said central wing portion, two substantially identical stabilizing as well as steering means connected to the said outer wing portions, and said stabilizing and steering means being mounted rearwardly of said outer wing portions and laterally offset from said central portion to produce in combination with said central portion, including the said propelling means, passenger housing and floating means, a channel for the air flow devoid of all obstructions rearwards of the said central portion of the sustaining wing.

10. In an airplane, a sustaining wing comprising a central portion and laterally extending outer portions, propelling means mounted on said central portion, an aerofoil-formed passenger housing being an integral part of said central portion, floating means of substantially Zeppelin-like form and equipped with hydrowings as well as steering means being attached to the said central portions, two substantially identical stabilizing as well steering means connected to the said outer wing portions, and said stabilizing and steering means being mounted rearwardly of said outer wing portions and laterally offset from said central portion to produce in combination with said central portion, including said propelling means, passenger housing and floating means, a channel for the air flow devoid of all obstructions in the rear of said central portion of said sustaining wing, and said means for steering in air and said means for steering in water being interlocked.

11. In an airplane, a sustaining wing, and stabilizing means adjacent to opposite ends of said wing, each of said stabilizing means comprising a stabilizing wing rigidly supported by said sustaining wing adjacent the end thereof and in rearwardly and upwardly spaced relation thereto, an elevator associated with said stabilizing wing, a structure providing a vertical stabilizing surface, extending between said supporting and stabilizing wings, and a rudder supported by said structure.

12. In an airplane, a sustaining wing, and stabilizing means adjacent to opposite ends of said wing, each of said stabilizing means comprising a stabilizing wing supported by said sustaining wing adjacent the end thereof and in rearwardly spaced relation as well as in alignment horizontally thereto, an elevator associated with said stabilizing wing, a structure providing a vertical stabilizing surface, extending between said supporting and stabilizing wings, and a rudder supported by said structure.

13. In an airplane, a sustaining wing, and stabilizing means adjacent to opposite ends of said wing, each of said stabilizing means comprising a stabilizing wing supported by said sustaining wing adjacent the end thereof and in rearwardly spaced relation thereto, an elevator associated with stabilizing wing, a structure providing a vertical stabilizing surface, extending between said supporting and stabilizing wings, a rudder supported by said structure, and said supporting and stabilizing wings having a V-form when viewed in the plan view.

14. In an airplane, a sustaining wing, and stabilizing means adjacent to opposite ends of said wing, each of said stabilizing means comprising an outer support secured to said wing, an inner support secured to said wing in inwardly spaced relation along said wing from said outer support, a horizontal stabilizing wing extending between said outer and inner support rearwardly of said sustaining wing, an elevator associated with said stabilizing wing, a rudder supported by said supports, and an aileron mounted between said supports on the trailing edge of said sustaining wing.

15. In an airplane, a sustaining wing, and stabilizing means adjacent to opposite ends of said wing, each of said stabilizing means comprising an outer support secured to said wing, an inner support secured to said wing in inwardly spaced relation along said wing from said outer support, a horizontal stabilizing wing rearwardly of said sustaining wing extending between said outer and inner supports and extending beyond one of said supports, an elevator associated with said stabilizing wing, and a rudder associated with one of said supports, said one support being formed to provide a vertical stabilizing surface in front of said rudder.

16. In an airplane, a sustaining wing, and stabilizing means adjacent to opposite ends of said wing, each of said stabilizing means comprising an outer support secured to said wing, an inner support secured to said wing in inwardly spaced relation along said wing from said outer support, a horizontal stabilizing wing rearwardly of said sustaining wing extending between said outer and inner supports and extending beyond each support, and an elevator associated with said stabilizing wing, and a rudder supported by said supports rearwardly of said sustaining wing.

17. In an airplane, a sustaining wing, and stabilizing means adjacent to opposite ends of said wing, each of said stabilizing means comprising a stabilizing wing supported by said sustaining wing adjacent the end thereof and in rearwardly spaced relation thereto, an elevator associated with said stabilizing wing, a structure providing a vertical stabilizing surface, extending between said supporting and stabilizing wings, and a rudder supported by said structure.

18. In an airplane, a sustaining wing, and stabilizing means adjacent to opposite ends of said wing, each of said stabilizing means comprising an outer support secured to said wing, an inner support secured to said wing in inwardly spaced relation along said wing from said outer support, a horizontal stabilizing wing extending between said outer and inner supports rearwardly of said sustaining wing, an elevator associated with said stabilizing wing, and a rudder associated with one of said supports, said one support being formed to provide a vertical stabilizing surface in front of said rudder.

19. In an airplane, a sustaining wing, and stabilizing means adjacent to opposite ends of said wing, each of said stabilizing means comprising an outer support secured to said wing, an inner support secured to said wing in inwardly spaced relation along said wing from said outer support, a stabilizing wing extending between said outer and inner supports rearwardly of said sustaining wing, an elevator associated with said stabilizing wing, and a rudder associated with said inner support, said outer support being formed to provide an upright stabilizing surface.

20. In an airplane, a sustaining wing, and stabilizing means adjacent to opposite ends of said wing, each of said stabilizing means comprising an outer support secured to said wing, an inner support secured to said wing and spaced inwardly along the wing from said outer support, a stabilizing wing extending between said outer and inner supports rearwardly of said sustaining wing, an elevator and a rudder associated with said stabilizing wing and said supports, said sustaining and stabilizing wings being braced by extending the profile of said wings transversely and joining said extended wing profiles to said supports to thereby form a rigid construction and support for said stabilizing wings, elevators and rudders.

21. In an airplane, a sustaining wing, two separate stabilizing means comprising an upright stabilizing fin attached transversely at each end of said sustaining wing, a stabilizing wing with elevator disposed behind each end of said sustaining wing, an outrigger extending rearwards from each end of said sustaining wing and spaced inwardly along the wing from said fin, each stabilizing wing being attached to and supported by one of said stabilizing fins and one of said outriggers, and rudders attached to and supported by said outriggers, said stabilizing wings being braced by extending the profile of said stabilizing wings transversely and joining said extended wing profiles to said outriggers and stabilizing fins to thereby form a rigid construction and support for said stabilizing wings, elevators and rudders, substantially as described.

MATHIAS HENTER.